United States Patent
Matsuoka

(10) Patent No.: US 7,315,134 B2
(45) Date of Patent: Jan. 1, 2008

(54) POWER SUPPLY FOR A HIGH VOLTAGE DEVICE

(75) Inventor: Junichi Matsuoka, Tokyo (JP)

(73) Assignee: NEC Microwave Tube, Ltd., Kanagawa (JP)

( * ) Notice: Subject to any disclaimer, the term of this patent is extended or adjusted under 35 U.S.C. 154(b) by 244 days.

(21) Appl. No.: 10/985,044

(22) Filed: Nov. 10, 2004

(65) Prior Publication Data

US 2005/0099140 A1    May 12, 2005

(30) Foreign Application Priority Data

Nov. 12, 2003 (JP) .............................. 2003-382388

(51) Int. Cl.
*H05B 41/16* (2006.01)
(52) U.S. Cl. .................. 315/247; 315/291; 315/307; 315/224; 315/209 R
(58) Field of Classification Search ................ 315/247, 315/246, 291, 307, 308, 297, 209 R, 224
See application file for complete search history.

(56) References Cited

U.S. PATENT DOCUMENTS

| | | | |
|---|---|---|---|
| 4,614,999 A | 9/1986 | Onodera et al. | |
| 4,928,295 A | 5/1990 | Tanaka | |
| 5,128,593 A * | 7/1992 | Gilbert | ........................ 315/287 |
| 5,568,369 A | 10/1996 | Ohms et al. | |
| 2004/0085027 A1* | 5/2004 | Nakagawa et al. | ......... 315/246 |

FOREIGN PATENT DOCUMENTS

| | | |
|---|---|---|
| JP | 61-179645 | 11/1986 |
| JP | 1-295665 | 11/1989 |
| JP | 11-149880 | 6/1999 |
| JP | 2003-153533 A | 5/2003 |

OTHER PUBLICATIONS

Patent Abstracts of Japan, vol. 1999, No. 11, Sep. 30, 1999.
Patent Abstracts of Japan, vol. 1998, No. 01, Jan. 30, 1998.

* cited by examiner

*Primary Examiner*—Tuyet Vo
(74) *Attorney, Agent, or Firm*—Foley & Lardner LLP

(57) ABSTRACT

Control of an output pulse width by a PWM control circuit is stopped and the initial pulse string having a fixed pulse width is outputted in order to obtain a power supply voltage rise within a predetermined time period at the time of turning on the power. During normal operation, the voltage detected by a voltage detecting circuit is captured by a PWM control circuit, and the pulse width of the output pulse string is adjusted according to the detected voltage in order to keep the power supply voltage constant.

9 Claims, 5 Drawing Sheets

POWER SUPPLY FOR A HIGH VOLTAGE DEVICE

BACKGROUND OF THE INVENTION

1. Field of Invention

The present invention relates to a power supply device that is suitably used for supplying a predetermined high voltage to a traveling wave tube that is used for amplification and generation of a high frequency signal.

2. Description of the Related Art

A traveling wave tube is an electronic tube for amplification and generation of a high frequency signal by an interaction between an electron beam emitted from an electron gun and a high frequency circuit. As shown in FIG. 1, such the traveling wave tube 1 is a construction that includes: for example, electron gun 10 for emitting electron beam 50; helix 20, which is a high-frequency circuit for causing interaction between electron beam 50 that is emitted from electron gun 10 and a high-frequency signal (microwave); electrode collector 30 for capturing electron beam 50 that is supplied from helix 20; and electrode anode 40 for guiding electron beam 50 that is emitted from electron gun 10 through helix 20.

Electron gun 10 is equipped with: electrode cathode 11 for emitting thermions; heater 12 for supplying thermal energy for causing electrode cathode 11 to emit thermions; and electrode Wehnelt 13 for focusing thermions to form electron beam 50.

A negative high voltage (cathode voltage) is supplied from power supply device 60 to electrode Wehnelt 13 and electrode cathode 11 of electron gun 10, and a predetermined heater voltage Ef is supplied to heater 12 on the basis of the potential of electrode cathode 11. In addition, a positive high voltage (direct-current voltage) is supplied to electrode collector 30 on the basis of the potential of electrode cathode 11. Electrode anode 40 and helix 20 are connected to the case of traveling wave tube 1 that is grounded. Traveling wave tube 1 also includes a configuration in which the connection between electrode anode 40 and helix 20 is cut and different power supply voltages are supplied to electrode anode 40 and helix 20.

In this configuration, electron beam 50, that is emitted from electron gun 10, is accelerated by electrode anode 40 and introduced into helix 20 and then travels inside helix 20 while interacting with the high-frequency signal that is applied as input to helix 20. Output electron beam 50 that is supplied from helix 20 is captured by electrode collector 30. At this time, a high-frequency signal that has been amplified by interaction with electron beam 50 is supplied as output from helix 20.

FIG. 2 is a block diagram showing the configuration of a conventional power supply device. The power supply device shown in FIG. 2 is an example of a configuration in which a predetermined power supply voltage (helix voltage Ehel) is supplied to electrode cathode 11 of traveling wave tube 1 shown in FIG. 1.

As shown in FIG. 2, the conventional power supply device comprises PWM (Pulse Width Modulation) control circuit 401 that outputs a pulse string matching a predetermined power supply voltage, switching element 402 which is turned on and off according to the pulse string outputted from PWM control circuit 401, and which generates a pulse string composed of a higher voltage, HV (High Voltage) transformer 403 boosting the pulse string outputted from switching element 402, rectifying circuit 404 rectifying the ac output of HV transformer 403, voltage detecting circuit 405 detecting an output voltage of rectifying circuit 404 and feeding a detected voltage Vfb, a result of the detection, back to PWM control circuit 401.

PWM control circuit 401 shown in FIG. 2 uses as a feedback voltage the detected voltage Vfb outputted from voltage detecting circuit 405 to adjust an output pulse width so that the feedback voltage remains constant, whereby the direct current voltage outputted from rectifying circuit 404 is kept constant.

In the above traveling wave tube 1, the order of application of voltages to electrodes should be controlled for preventing a situation in which an excessive current passes through helix 20 and damages helix 20 at the time that the power is turned on. The rise time of a helix voltage Ehel (voltage applied to electrode cathode 11 on the basis of grounded helix 20) should be reduced.

This is a measure required for preventing helix 20 from being damaged by the generation of heat associated with power consumption because electrons emitted from electrode cathode 11 are fed back to power supply device 60 through helix 20 without being captured by electrode collector 30 in a transient state in which the voltage applied to each electrode does not reach a predefined value.

In order to solve this problem, a power supply device comprising a sequence control circuit for controlling the order of application of voltages to electrodes is proposed, for example, in Japanese Patent Laid-Open No. 11-149880 (hereinafter referred to as Patent Document 1).

Patent Document 1 describes a method of controlling the introduction and blocking of anode voltages by using a small lead relay in a traveling wave tube in which connection between the electrode anode and the helix is cut.

In the traveling wave tube in which connection between the electrode anode and the helix is cut, as described above, if the electrode cathode and the electrode anode are set to have the same potential at the time of turning on the power, emission of electrons from the electrode cathode is prevented, thus making it possible to inhibit a helix current in a transient state when the power is turned on. Thus, in the high voltage power supply device described in the above Patent Document 1, the power is turned on while the electrode cathode and the electrode anode are set to have almost the same potential (negative potential), and then a voltage, applied to the electrode anode, is changed to a predefined voltage that uses a small lead relay having a low withstanding pressure.

However, in a configuration in which electrode anode 40 is connected to helix 20 and a common power supply voltage (e.g. ground potential) is supplied, such sequence control cannot be performed. Therefore, the instant when the power is turned on, a potential difference occurs between electrode cathode 11 and electrode anode 40, and electrons are emitted from electrode cathode 11 to cause passage of a considerable current through helix 20. Thus, when the power for the traveling wave tube shown in FIG. 1 is turned on, the helix voltage Ehel increase should be limited to a specific time period so that excess current does not damage helix 20. It is desirable that this should also be considered in the traveling wave tube in which connection between electrode anode 40 and helix 20 is cut.

The conventional power supply device described above has a configuration in which the output voltage of rectifying circuit 404 is detected by voltage detecting circuit 405, and the detection result is fed back to PWM control circuit 401 in order to keep the power supply voltage constant as shown in FIG. 2, and therefore the rise time of the power supply voltage at the time that the power is turned on depends on characteristics of the elements constituting the power supply device shown in FIG. 2.

Thus, control and reduction of rise time of the power supply voltage at the time of turning on the power is difficult, and helix 20 may be damaged when the power is turned on. There are cases where helix 20 has an excessive load and, even if the helix 20 is not damaged, the performance of traveling wave tube 1 will be degraded which will result in instability of operations.

SUMMARY OF THE INVENTION

An object of the present invention is to provide a power supply device capable of preventing damage and degradation in performance of a device to which a voltage is applied by reducing rise time of a power supply voltage at the time of turning on the power.

To achieve the above object, in the present invention, control of an output pulse width by a PWM control circuit is stopped, and the initial pulse string having a fixed pulse width is outputted in order to obtain a power supply voltage rise within a predetermined time period at the time of turning on the power. During normal operation, the voltage detected by a voltage detecting circuit is captured by the PWM control circuit, and the pulse width of the output pulse string is adjusted according to the detected voltage in order to keep the power supply voltage constant.

In the configuration described above, the power supply voltage can be made to rise at a high speed at the time of turning on the power, and therefore degradation and damage to, for example, the helix of a traveling wave tube to which the power supply voltage is applied can be prevented, resulting in prevention of degradation in performance.

The above and other objects, features, and advantages of the present invention will become apparent from the following description with reference to the accompanying drawings which illustrate examples of the present invention.

BRIEF DESCRIPTION OF THE DRAWINGS

FIG. 6 is a block diagram showing an arithmetic processing unit outputting an initial pulse string having a fixed pulse width output at the time the power is turned on wherein the pulse width narrows after a period of time, until said power supply voltage reaches 80% of a defined value or greater after the power is turned on.

DETAILED DESCRIPTION OF THE PREFERRED EMBODIMENTS

The present invention will now be described with reference to the drawings.

First Embodiment

Figure 1:
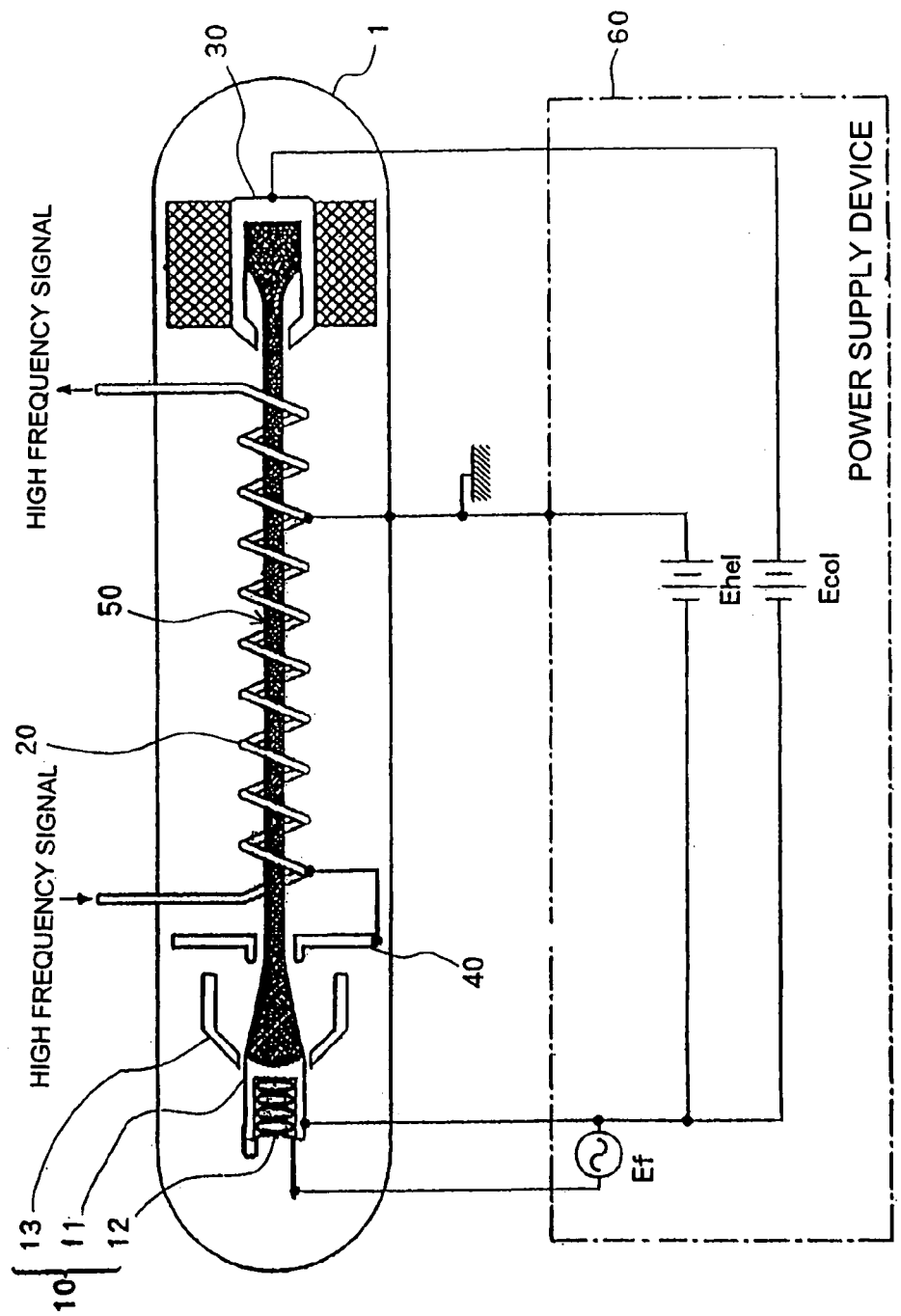
FIG. 1 is a schematic diagram showing one example of the configuration of a traveling wave tube.
Figure 2:
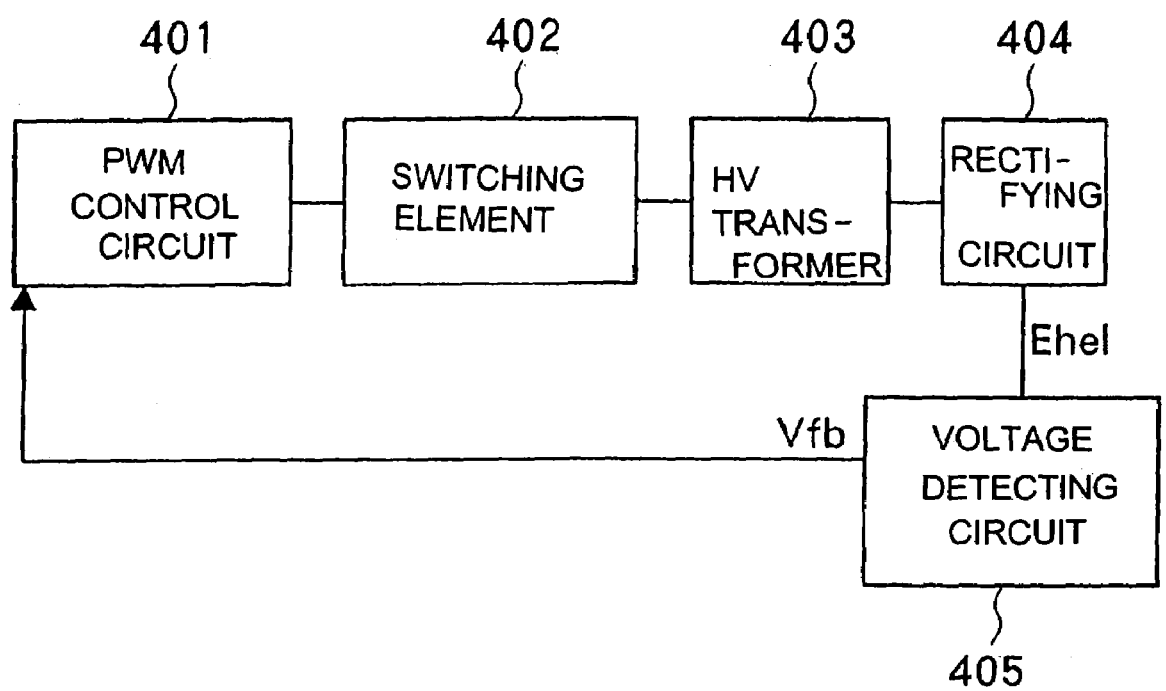
FIG. 2 is a block diagram showing the configuration of a conventional power supply device.
Figure 3:
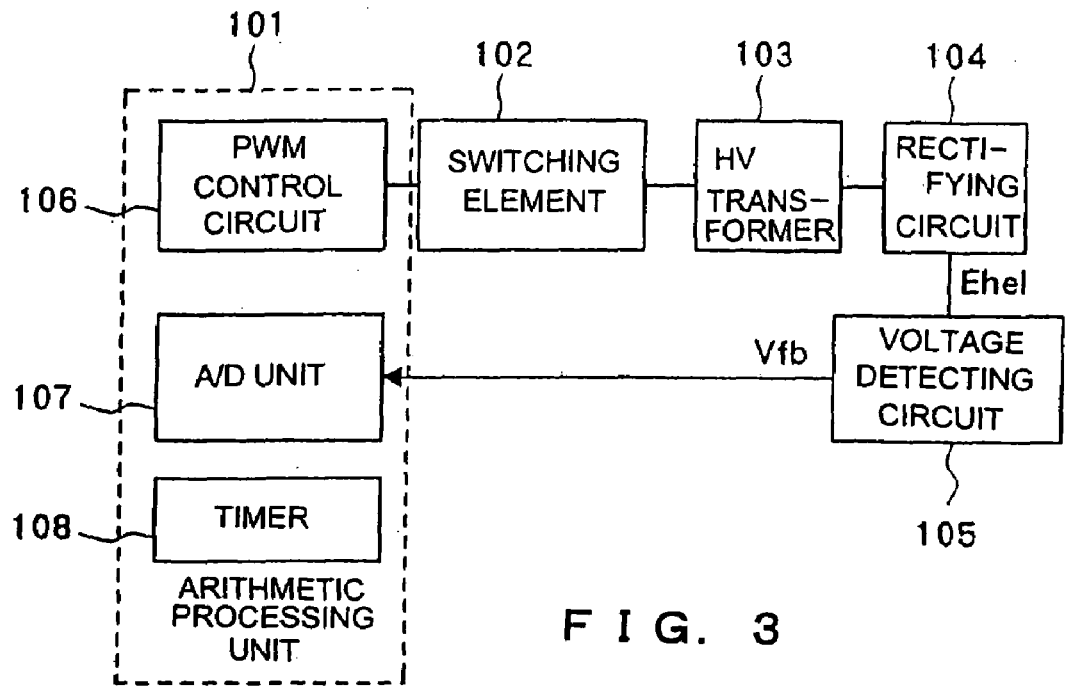
FIG. 3 is a block diagram showing the configuration of the first embodiment of the power supply device of the present invention.

FIG. 3 is a block diagram showing the configuration of the first embodiment of a power supply device of the present invention. The power supply device shown in FIG. 3 is an example of a power supply device which is suitably used for supplying a predetermined power supply voltage (helix voltage Ehel) to electrode cathode 11 of traveling wave tube 1 shown in FIG. 1. The power supply device shown in FIG. 3 can be used as a power supply device to supply a predetermined direct-current voltage to electrode collector 30, electrode anode 40 and heater 12 of traveling wave tube 1 or other devices requiring high voltages.

As shown in FIG. 3, the power supply device of the first embodiment comprises arithmetic processing unit 101 for outputting a pulse string matching a predetermined power supply voltage, switching element 102 which is turned on and off according to the pulse string outputted from arithmetic processing unit 101 and which generates a pulse string having a higher voltage, HV transformer 103 for increasing the voltage of the pulse string outputted from the switching element 102, rectifying circuit 104 for rectifying the ac output of HV transformer 103, and voltage detecting circuit 105 for detecting the output voltage of rectifying circuit 104 which feeds detected voltage Vfb, a result of the detection, back to arithmetic processing unit 101. A redoubling rectifying circuit for rectifying the ac voltage and redoubling the rectified voltage may be used for rectifying circuit 104.

Arithmetic processing unit 101 comprises PWM control circuit 106 outputted from the pulse string described above, A/D unit 107 for converting the detected voltage Vfb, an analog voltage outputted from voltage detecting circuit 105, into digital data, and timer 108.

PWM control circuit 106 captures through A/D unit 107 the detected voltage Vfb outputted from voltage detecting circuit 105 and adjusts an output pulse width according to the detected voltage Vfb in order to keep constant the direct-current voltage outputted from rectifying circuit 104 during normal operation. Arithmetic processing unit 101 comprises, for example, an arithmetic function, an A/D conversion function and a memory function, and is comprised of a logical circuit, DSP (Digital Signaling Processor), microcomputer or the like that performs processing of PWM control circuit 106 according to a program previously stored in the memory element and control processing A/D unit 107 and timer 108.

Figure 6:
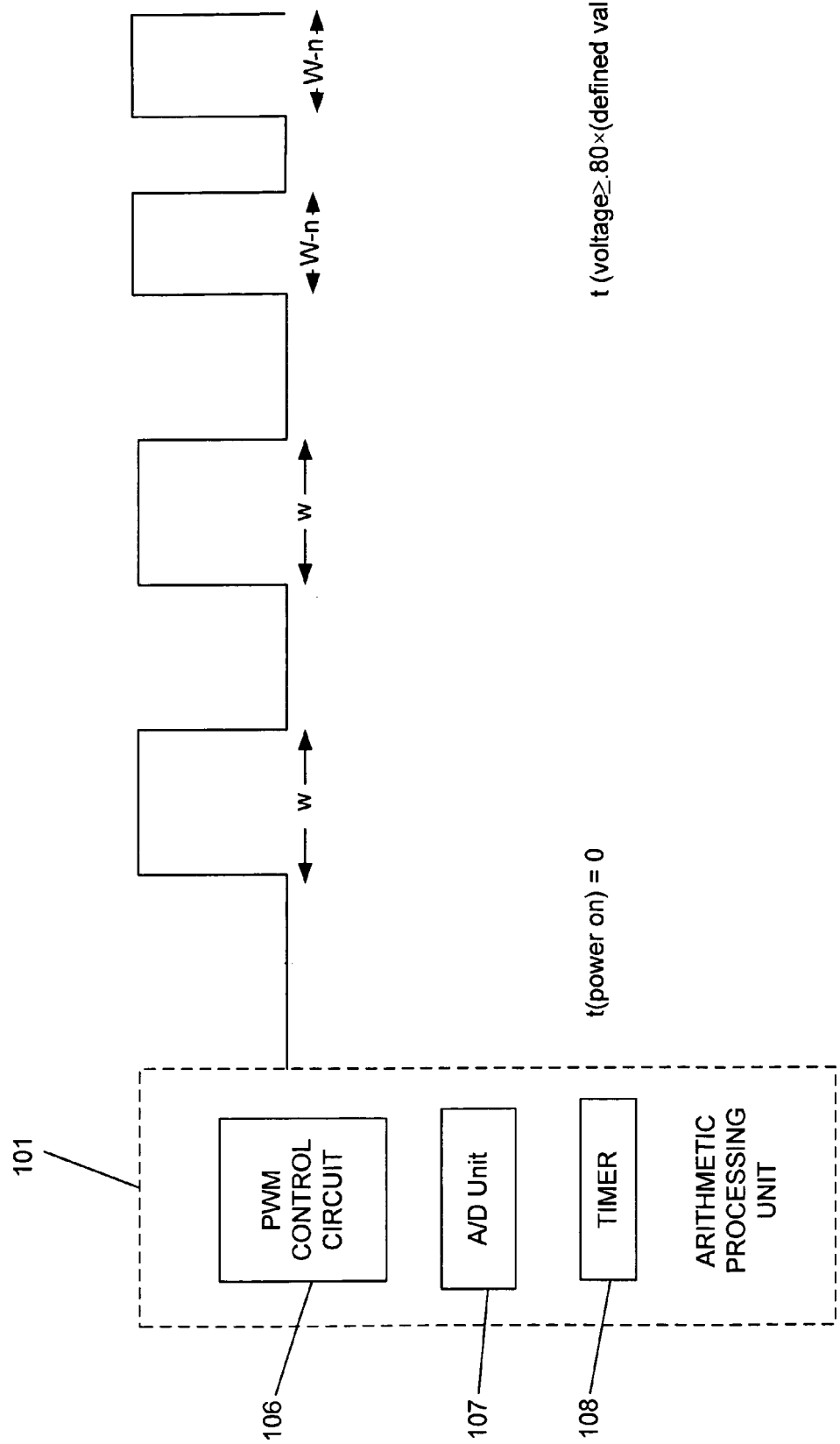

In this configuration, as shown in FIG. 6, arithmetic processing unit 101 stops control of the output pulse width by PWM control circuit 106 and outputs an initial pulse string having a preset fixed pulse width during introduction of the power supply voltage (helix voltage Ehel). At this time, the output pulse width of PWM control circuit 106 is set to a value such that the amount of energy required for the power supply voltage (Ehel) to rise within a time period during which helix 20 is not damaged is outputted.

Arithmetic processing unit 101 operates timer 108 the instant when the power is turned on, and feeds the detected voltage Vfb outputted from voltage detecting circuit 105 back to PWM control circuit 106, and starts control of the power supply voltage using the detected voltage Vfb by PWM control circuit 106. The timeout duration of timer 108 is set for a period until the power supply voltage reaches 80% of a predefined value or greater after the power is turned on in a state in which the above initial pulse string is outputted.

According to the power supply device of this embodiment, the helix voltage Ehel can be made to rise at a high speed at the time of turning on the power, degradation and damage of helix 20 is prevented, which results in the prevention of degradation in performance of traveling wave tube 1.

Second Embodiment

Figure 4:
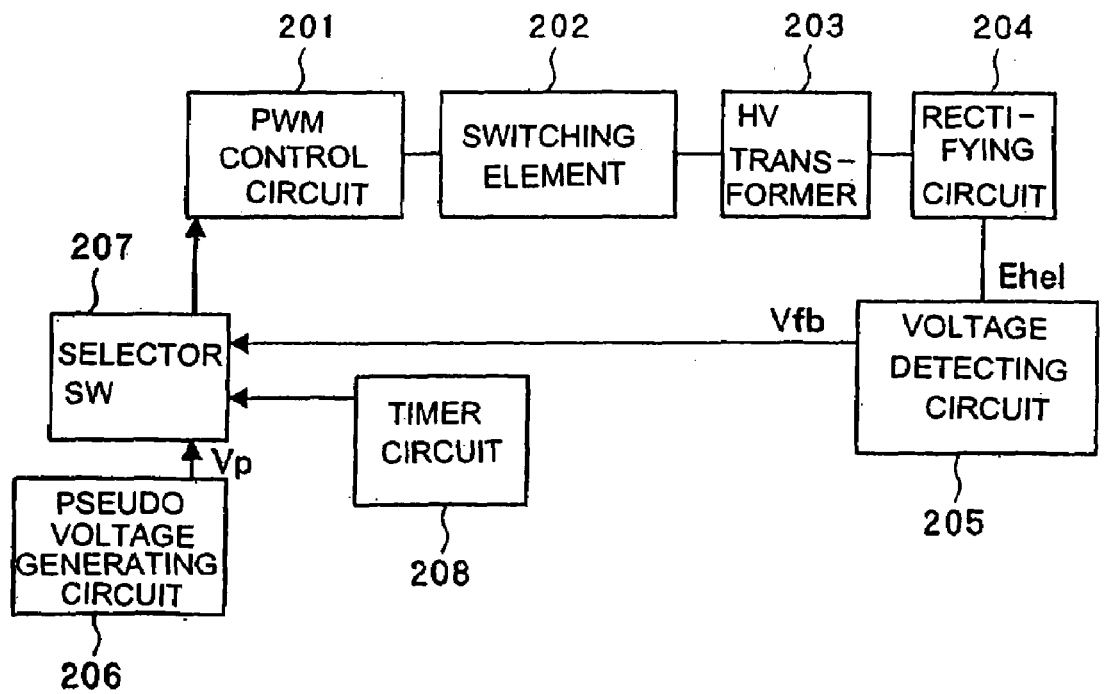
FIG. 4 is a block diagram showing the configuration of the second embodiment of the power supply device of the present invention.

FIG. 4 is a block diagram showing the configuration of the second embodiment of the power supply device of the present invention. The power supply device shown in FIG. 4 is an example of a power supply device which is suitably used for supplying a predetermined power supply voltage (helix voltage Ehel) to electrode cathode 11 of traveling wave tube 1 shown in FIG. 1. The power supply device shown in FIG. 4 can also be used as a power supply device to supply a predetermined direct-current voltage to electrode collector 30, electrode anode 40 and heater 12 of traveling wave tube 1 or other devices requiring high voltages.

As shown in FIG. 4, the power supply device of the second embodiment comprises PWM control circuit 201 that outputs a pulse string matching a predetermined power supply voltage, switching element 202 which is turned on and off according to the pulse string outputted from PWM control circuit 201 and which generates a pulse string having a higher voltage, HV transformer 203 for increasing the voltage of the pulse string outputted from switching element 202, rectifying circuit 204 to rectifying the ac output of HV transformer 203, voltage detecting circuit 205 for detecting the output voltage of rectifying circuit 204 and for outputting detected voltage Vfb, a result of the detection, pseudo voltage generating circuit 206 for generating a pseudo voltage Vp, a predetermined fixed voltage, which Is used as a feedback voltage to PWM control circuit 201 at the time of turning on the power, timer circuit 208 for starting an operation the instant when the power is turned on, and for outputting a timeout signal after a predetermined time period, and selector SW 207 for supplying the detected voltage Vfb or the pseudo voltage Vp to PWM control circuit 201 according to the output signal of timer circuit 208. For rectifying circuit 204, a redoubling rectifying circuit that rectifies the ac voltage and redoubles the rectified voltage may be used. Timer circuit 208 and selector SW 207 comprise, for example, a logic circuit and the like that perform processing as described below.

In this configuration, selector SW 207 first supplies the pseudo voltage Vp by pseudo voltage generating circuit 206 to PWM control circuit 201 when the power supply voltage device is turned on. PWM control circuit 201 controls the pulse width of an initial pulse string using the pseudo voltage Vp as feedback voltage. At this time, the pseudo voltage Vp is set to a value smaller than the detected voltage Vfb outputted from voltage detecting circuit 205 during normal operation so that power supply voltage rise is limited to a specific time period to ensure that no damage is done to helix 20.

Timer circuit 208 starts an operation the instant when the power is turned on, and outputs a timeout signal after the elapse of preset predetermined time. Selector SW 207 detects the timeout signal from timer circuit 208, and then supplies the detected voltage Vfb outputted from voltage detecting circuit 205 to PWM control circuit 201. PWM control circuit 201 receives the detected voltage Vfb from selector SW 207, and then starts control of the power supply voltage by the pulse width of the output pulse string using the detected voltage Vfb as feedback voltage.

The timeout period of timer circuit 208 is set to a time period until the power supply voltage reaches 80%, for example, of a predefined value or greater after the power is turned on in a state in which the pseudo voltage Vp for the above PWM control circuit 201 is fed back.

According to the power supply device of this embodiment, the helix voltage Ehel can be made to rise at a high speed at the time of turning on the power, and therefore degradation and damage of helix 20 are prevented, which results in the prevention of degradation in performance of the traveling wave tube 1 as in the case of the first embodiment.

Third Embodiment

Figure 5:
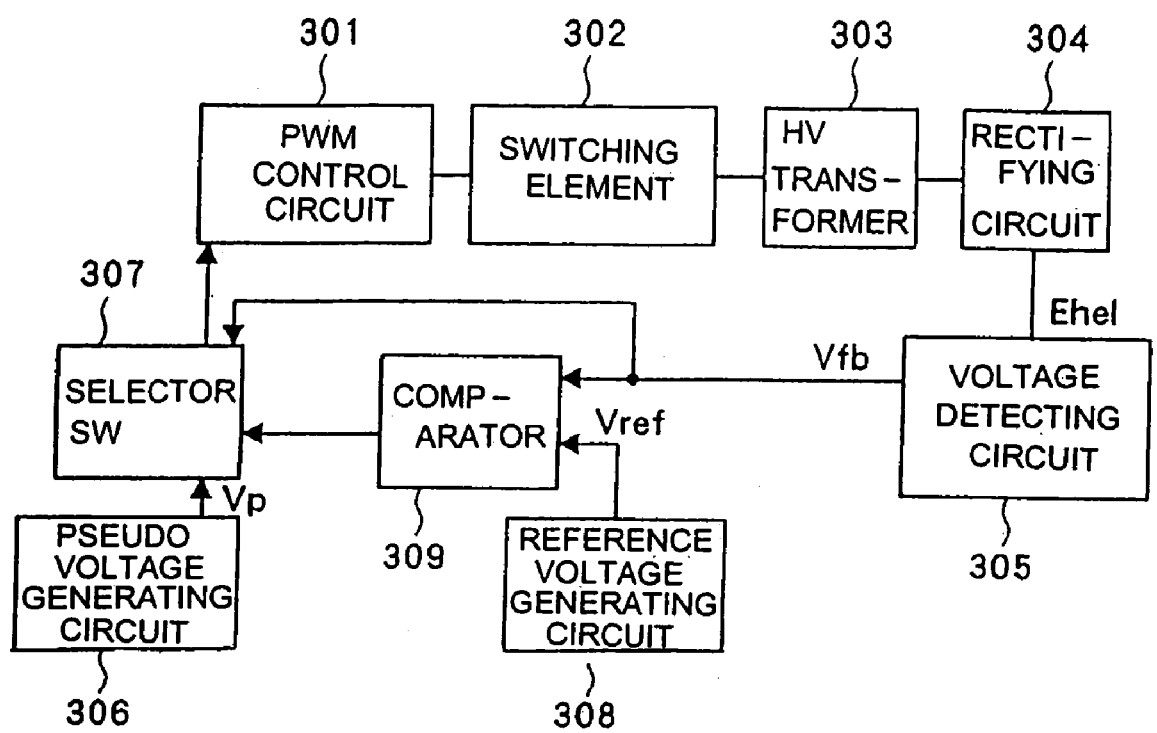
FIG. 5 is a block diagram showing the configuration of the third embodiment of the power supply device of the present invention.

FIG. 5 is a block diagram showing the configuration of the third embodiment of the power supply device of the present invention. The power supply device shown in FIG. 5 is an example of a power supply device which is suitably used for supplying a predetermined power supply voltage (helix voltage Ehel) to electrode cathode 11 of traveling wave tube 1 shown in FIG. 1. The power supply device shown in FIG. 5 can also be used as a power supply device supplying a predetermined direct-current voltage to electrode collector 30, electrode anode 40 and heater 12 of traveling wave tube 1 or other devices requiring high voltages.

As shown in FIG. 5, the power supply device of the third embodiment comprises PWM control circuit 301 that outputs a pulse string matching a predetermined power supply voltage, switching element 302 which is turned on and off according to the pulse string outputted from PWM control circuit 301 and which generates a pulse string having a higher voltage, HV transformer 303 for increasing the voltage of the pulse string outputted from the switching element 302, rectifying circuit 304 for rectifying the ac output of the HV transformer 303, voltage detecting circuit 305 for detecting an output voltage of rectifying circuit 304 and for outputting detected voltage Vfb, a result of the detection, pseudo voltage generating circuit 306 for generating pseudo voltage Vp, being a predetermined fixed voltage, which is used as feedback voltage to PWM control circuit 301 at the time of turning on the power, reference voltage generating circuit 308 for generating voltage Vref, a predetermined fixed voltage, comparator 309 for comparing the detected voltage Vfb with the reference voltage Vref and for outputting the comparison result, and selector SW 307 for outputting the detected voltage Vfb or the pseudo voltage Vp to PWM control circuit 301 according to comparator 309. For rectifying circuit 304, a redoubling rectifying circuit to rectify the ac voltage and to redouble the rectified voltage may be used. Comparator 309 and selector SW 307 comprise, for example, a logic circuit and the like that perform processing as described below.

In this configuration, selector SW 307 first supplies the pseudo voltage Vp by pseudo voltage generating circuit 306 to PWM control circuit 301 during introduction of the power supply voltage (helix voltage Ehel). PWM control circuit 301 controls the pulse width of an initial pulse string using the pseudo voltage Vp as a feedback voltage. At this time, the pseudo voltage Vp is set to a value smaller than the detected voltage Vfb outputted from voltage detecting circuit 305 during normal operation so that power supply voltage rise is limited to a specific time period to ensure that no damage is done to helix 20.

The reference voltage Vref generated by reference voltage generating circuit 308 is set, for example, to a value equal to the value of the detected voltage equivalent to 80% of the predefined value of the power supply voltage (helix voltage Ehel), and comparator 309 outputs a switching signal for outputting the detected voltage Vfb from selector SW 307 when the Vfb exceeds the reference voltage Vref.

Selector SW 207 receives a switching signal from comparator 309, and then supplies the detected voltage Vfb outputted from voltage detecting circuit 305 to PWM control circuit 301. PWM control circuit 301 receives the detected voltage Vfb from selector SW 207, and then starts control of the power supply by the pulse width of the output pulse string using the detected voltage Vfb as a feedback voltage.

According to the power supply device for traveling wave tubes of this embodiment, the helix voltage Ehel can be made to rise at a high speed at the time of turning on the power, and therefore degradation and damage of the helix 20 are prevented, which results in the prevention of degradation in performance of the traveling wave tube 1 as in the case of the first and second embodiments.

While preferred embodiments of the present invention have been described using specific terms, such description is for illustrative purposes only, and it is to be understood that changes and variations may be made without departing from the spirit or scope of the following claims.

What is claimed is:

1. A power supply device for generating a predetermined power supply voltage comprising:
   a voltage detecting circuit for detecting said power supply voltage and for outputting a detected voltage being a result of the detection; and
   an arithmetic processing circuit for capturing said detected voltage and for adjusting a pulse width of an output pulse string according to the detected voltage in order to keep said power supply voltage constant during normal operation, and for outputting an initial pulse string having a fixed pulse width for making said power supply voltage rise within a predetermined time period at a time of turning on the power.

2. The power supply device according to claim 1, wherein said arithmetic processing circuit starts control of said power supply voltage using said detected voltage after a time period until said power supply voltage reaches 80% of a defined value or greater after said turning on the power.

3. The power supply device according to claim 1, wherein said power supply voltage is a helix voltage applied between an electrode cathode and the helix of a traveling wave tube.

4. A power supply device for generating a predetermined power supply voltage comprising:
   a voltage detecting circuit for detecting said power supply voltage and outputting a detected voltage being a result of the detection;
   a PWM control circuit for capturing said detected voltage and adjusting a pulse width of an output pulse string according to the detected voltage in order to keep said power supply voltage constant during normal operation, and for outputting an initial pulse string having a fixed pulse width for making said power supply voltage rise within a predetermined time period at a time of turning on the power;
   a pseudo voltage for generating circuit generating a pseudo voltage being a predetermined fixed voltage for outputting said initial pulse string from said PWM control circuit;
   a timer circuit starting an operation the instant when the power is turned on, and outputting a timeout signal after a predetermined time period; and
   a selector switch for supplying said pseudo voltage to said PWM control circuit as a feedback signal the instant when the power is turned on, with said pseudo voltage and said detected voltage as an input, and for supplying said detected voltage to said PWM control circuit as a feedback signal when receiving said timeout signal.

5. The power supply device according to claim 4, wherein said timer circuit outputs said timeout signal after a time period until said power supply voltage reaches 80% of a predefined value or greater after said turning on the power.

6. The power supply device according to claim 4, wherein said power supply voltage is a helix voltage applied between an electrode cathode and the helix of a traveling wave tube.

7. A power supply device for generating a predetermined power supply voltage comprising:
   a voltage detecting circuit for detecting said power supply voltage and outputting a detected voltage being a result of the detection;
   a PWM control circuit for capturing said detected voltage and adjusting a pulse width of an output pulse string according to the detected voltage in order to keep said power supply voltage constant during normal operation, and for outputting an initial pulse string having a fixed pulse width for making said power supply voltage rise within a predetermined time period at a time of turning on the power;
   a pseudo voltage generating circuit for generating a pseudo voltage being a predetermined fixed voltage for outputting said initial pulse string from said PWM control circuit;
   a reference voltage generating circuit for generating a reference voltage being a predetermined fixed voltage which is compared with said detected voltage;
   a selector switch for supplying said pseudo voltage to said PWM control circuit as a feedback signal the instant when the power is turned on, with said pseudo voltage and said detected voltage as an input, and for supplying said detected voltage to said PWM control circuit as a feedback signal when said detected voltage exceeds said reference voltage; and
   a comparator for comparing said detected voltage with said reference voltage, and for outputting a switching signal for switching an output of said selector switch to said detected voltage when the detected voltage exceeds said reference voltage.

8. The power supply device according to claim 7, wherein said reference voltage generating circuit generates a reference voltage equal to a detected voltage equivalent to 80% of a predefined value of said power supply voltage or greater.

9. The power supply device according to claim 7, wherein said power supply voltage is a helix voltage applied between an electrode cathode and the helix of a traveling wave tube.

* * * * *